Patented Jan. 1, 1929.

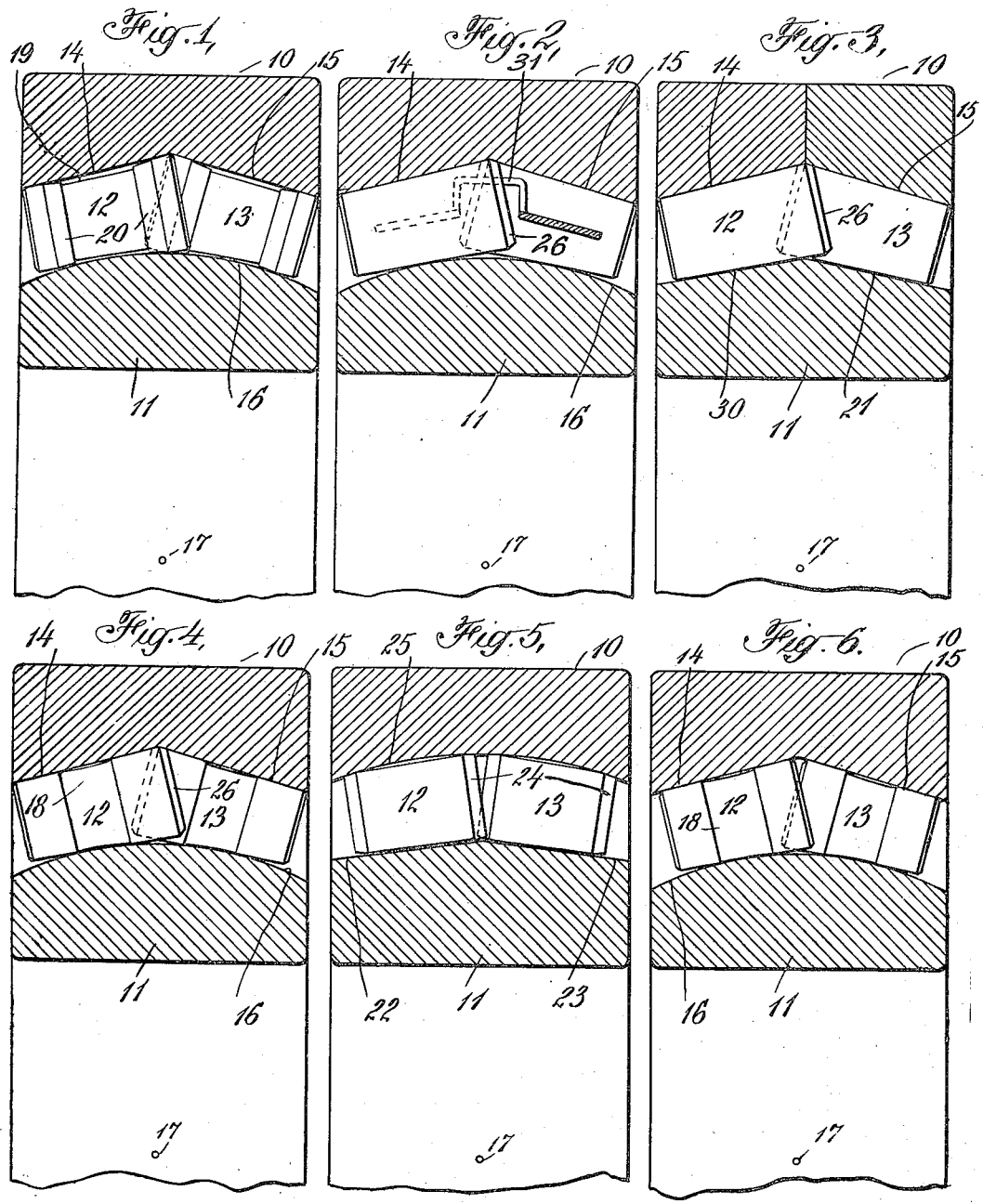

1,697,493

UNITED STATES PATENT OFFICE.

WILHELM B. BRONANDER, OF MONTCLAIR, NEW JERSEY.

ROLLER BEARING.

REISSUED

Application filed July 19, 1921, Serial No. 485,822. Renewed May 16, 1928.

This invention relates particularly to bearings of the type disclosed in my companion application 412,223 wherein the load is carried by two angularly related series of rollers operating between companion bearing members.

Special objects of the invention are to insure proper spacing of the rollers, to arrange for carrying thrust loads and to accomplish all this in a simple, practical and compact form of bearing.

In the accompanying drawing, wherein I have illustrated a few of the possible embodiments of the invention, these desired results are attained by arranging the rollers of one series in overlapping relation to the rollers of the other series.

In the drawings

Fig. 1 is a cross sectional elevation of one form of bearing constructed in accordance with the invention;

Fig. 2 is a similar sectional elevation showing another embodment of the invention;

Fig. 3 is a sectional elevation of a bearing similar to Fig. 2 but in which both the inner and outer tracks are conical;

Fig. 4 is a sectional elevation of a bearing similar to that shown in Figs. 1 and 2 but having a slightly different form of rollers;

Fig. 5 is a sectional elevation of another form of bearing constructed in accordance with the invention in which the outer track is concaved and the inner track is conical; and Fig. 6 illustrates in sectional elevation still another embodiment of the invention.

In these views 10 designates the outer bearing member, 11 the inner bearing member, 12 the rollers of one annular series and 13 the rollers of the companion annular series.

The rollers in all the forms shown are of tapered construction and are arranged with their larger ends inward or toward the center of the bearing. Also in the different forms shown the rollers of one series are inclined bodily with respect to the rollers of the other series, the outer and smaller ends of the rollers in each series being inclined inwardly toward the axis of the bearing. Also the taper and the incline of the rollers may be such that lines extending from the outer and inner surfaces of the rollers will converge to the axis of the bearing, as in my prior application above referred to.

In the first instance shown and in Figs. 2 and 4 the outer bearing member is formed with conical tracks 14 and 15 and the inner bearing member has a convex track 16 formed as the segment of a sphere whose center is located at the center 17 of the bearing. Also in these views the tapered rollers are adapted to bear at their ends on the outer conical tracks and are adapted to bear at intermediate portions between the ends on the inner convex track.

In the simplest form of the invention shown, Fig. 2, the rollers are of plain, longitudinally tapered construction so that they have a full length contact with the outer conical tracks and an intermediate tangential bearing on the inner covex track.

In Fig. 4 this construction is varied to the extent of providing the intermediate portions of the rollers with concave annular grooves 18 of approximately the curvature of the inner convex track.

In Fig. 1 the intermediate portions of the rollers are reduced at 19 so as to be entirely free of engagement with the tracks and at the ends of these reduced portions conical bearing surfaces 20 are provided making tangential contact with the inner convex track.

Fig. 3 differs from Fig. 2 only in that the inner member instead of having a convex track has inclined conical tracks 30 and 21 opposed to the outer conical tracks 14 and 15 respectively.

In Fig. 5 the rollers which are of outwardly tapering construction, bear with their intermediate portions on the conical tracks 22, 23 of the inner member and have conical end portions 24 bearing on the outer concave track 25.

A special feature common to all these constructions is that the rollers of the two relatively inclined sets are "staggered" so that the inner ends of the rollers in one set stand between and operate as spacers between the inner ends of the rollers in the companion set. This causes the rollers of one set to automatically assist in controlling proper operation of the rollers in the other set. Preferably the rollers of the two sets overlap only to a relatively slight extent so as to avoid friction as much as possible, and they may be positively spaced in proper relation by a retainer such as indicated at 31.

Another important feature of the invention is the provision of the rollers with bearing surfaces such as I have indicated at 26 in Figs. 2, 3 and 4 at their inner ends so arranged that when the rollers of the two sets are assembled, these bearing surfaces at the ends of the rollers in one set will "bear" on the tracks provided for the rollers of the other set. This cooperative relation enables the rollers to carry thrust loads as will be evident from the views referred to.

In addition to other advantages mentioned the structures of Figs. 1, 2, 4 and 5 have the further important feature of being self-adjusting or self-aligning.

The structure shown in Fig. 6 is similar in a general way to that of Fig. 4, the main difference being that the rollers are shorter, it being found unnecessary in some instances to have the end thrust feature, since the annular grooves in the intermediate portions of the rollers serve to center the same.

What I claim is:

1. In a roller bearing, an inner bearing member having a convexly curved track, an outer bearing member having edge to edge abutting conical tracks both opposed to the curved track of the first member, a set of rollers bearing at their opposite ends on one of the conical tracks and at their intermediate portions on the convex track and a second set of rollers bearing at their ends on the other conical track and at their intermediate portions on the curved track, the rollers of the two series standing in overlapping relation at the abutting edges of the two conical tracks.

2. The structure of claim 1 in which the overlapping portions of the rollers in each series extend beyond their bearing tracks into thrust engagement with the other tracks.

3. In a roller bearing, a bearing member having edge to edge related reversely inclined conical tracks, a second bearing member having a curved bearing track formed as an arc struck from the center of the bearing and opposed to both the conical tracks, a series of rollers bearing at their opposite ends on one of the conical tracks and a second series of rollers bearing at their opposite ends on the other conical track, both said series of rollers engaging the curved track and whereby the load is carried by the two sets of rollers and the bearing is self-centering.

4. In a roller bearing, cooperating bearing members having relatively inclined tracks and two sets of relatively inclined tapered rollers riding on said tracks, one set of rollers being disposed at one side of the longitudinal center of the bearing and the other set being disposed at the other side of the center, the inner ends only of the rollers of said sets overlapping, the inner ends of the rollers of each set engaging the track of the other set adjacent the longitudinal center of the bearing, whereby each track operates as a thrust bearing for the rollers of the other track.

5. In a roller bearing, cooperating bearing members having relatively inclined tracks and two sets of relatively inclined tapered rollers riding on said tracks and overlapping at their inner ends only, the inner ends of the rollers of each set engaging the track of the other set adjacent the longitudinal center of the bearing, whereby each track operates as a thrust bearing for the rollers of the other track, the outer bearing member having conical bearing tracks with the apex disposed centrally thereof and the base of the cone disposed nearer the axis of rotation than the apex.

6. In a roller bearing, cooperating bearing members having relatively inclined tracks and two sets of relatively inclined tapered bearing rollers riding on said tracks, said rollers being disposed with their larger ends adjacent the longitudinal center of the bearing and in overlapping relation, the inner ends of the rollers of each set engaging the track of the other set.

In witness whereof, I have hereunto set my hand this 12th day of July, 1921.

WILHELM B. BRONANDER.